(No Model.)

J. O. MEYER & W. STRICKLER.
MACHINE FOR BAKING WAFERS.

No. 334,451. Patented Jan. 19, 1886.

Witnesses:
Al. Stark.
Willie O. Stark.

Inventors:
Joseph O. Meyer,
Walter Strickler
by Michael J. Stark,
Attorney.

United States Patent Office.

JOSEPH O. MEYER AND WALTER STRICKLER, OF BUFFALO, NEW YORK.

MACHINE FOR BAKING WAFERS.

SPECIFICATION forming part of Letters Patent No. 334,451, dated January 19, 1886.

Application filed August 14, 1885. Serial No. 174,366. (No model.)

*To all whom it may concern:*

Be it known that we, JOSEPH O. MEYER and WALTER STRICKLER, of Buffalo, in Erie county, State of New York, have jointly invented certain new and useful Improvements in Machines for Baking Wafers, &c.; and we do hereby declare that the following description of our said invention, taken in connection with the accompanying sheet of drawings, forms a full, clear, and exact specification, which will enable others skilled in the art to which it appertains to make and use the same.

Our present invention has general reference to improvements in machines for baking the so-called Swiss "hippen;" and it consists, essentially, in the novel and peculiar combination of parts and details of construction, as hereinafter first fully set forth and described, and then pointed out in the claims.

Figure 1:
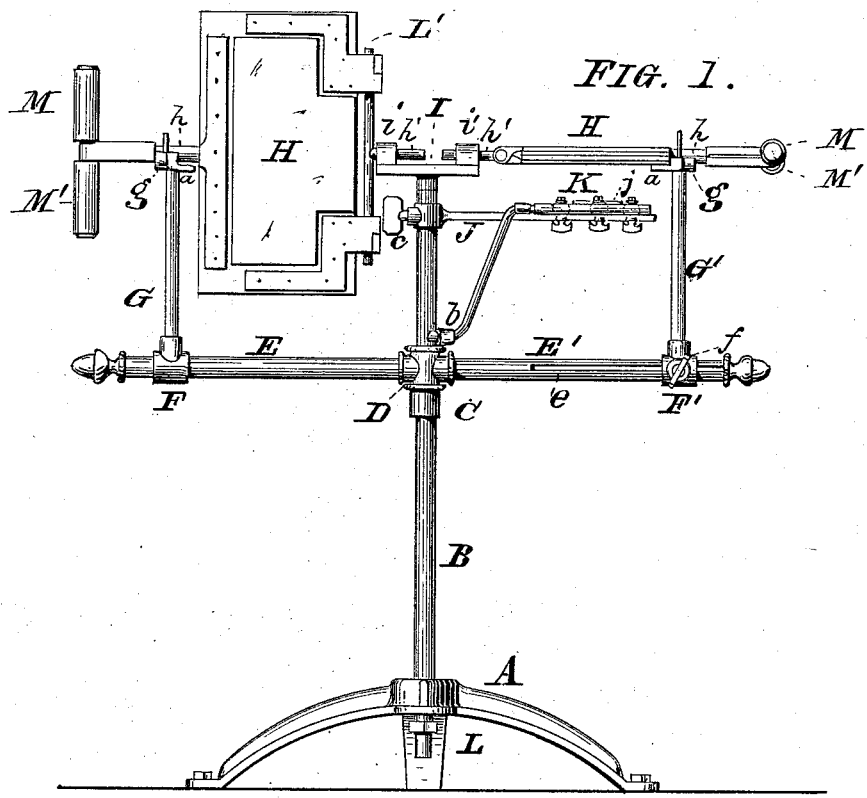
Figure 2:
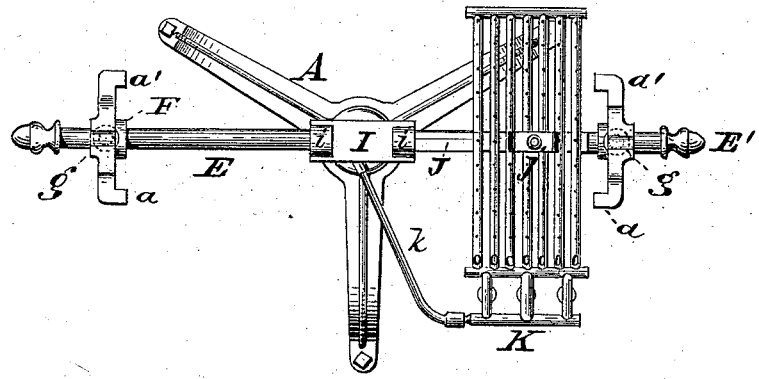

In the drawings already referred to, which serve to illustrate our said invention more fully, Figure 1 is a front elevation, and Fig. 2 a plan, of our improved machine.

Like parts are designated by corresponding letters of reference in all the figures.

The object of our present invention is the production of a simple, durable, and efficient machine for baking that class of confect or biscuit now imported from France and Switzerland, and usually called French or Swiss "hippen;" also for baking wafers and the like; and to attain this end we construct a support and frame-work for the molds substantially of a tripod or base, A, from which rises centrally a hollow standard, B, carrying centrally a collar, C, upon which rests a swinging arm consisting of a cross-piece, D, into which are securely fastened two oppositely-projecting arms, E E'. Upon these arms we arrange two uprights, G G', secured within adjustable sockets F F', said sockets having thumb-screws *f*, the points of which engage grooves *e* in said arms, so as to retain the uprights G G' in a vertical position.

On the upper end of the uprights G G' are provided semicircular bearings *g*, serving as boxes for the journals *h* of the mold or pan H, said bearings having extensions *a*, Fig. 2, acting as rests for said mold, as hereinafter to be referred to.

On the upper end of the standard B is pivoted or swiveled a double bearing-piece, I, having boxes *i*, for the reception of the pintle-bearers *h'* of the mold H. Below this bearing-piece is adjustably secured an arm or bracket, J, upon which is secured a gas-burner, K, by means of a clamping-plate, *j*, and a suitable bolt, said gas-burner consisting of a series of pipes provided with apertures, from which the gas escapes, said burner being well known, and need not therefore be here particularly described. The standard B is hollow, and has on its lower end a hose-coupling, L, by which and a suitable hose gas is conveyed to the burner K, there being a nipple, *b*, Fig. 1, and a short section of hose, *k*, connecting said standard with the burner, as clearly shown in the drawings. The arm or bracket J may be raised or lowered on the standard, and when adjusted securely fastened thereto by a thumb-screw, *c*, it being made adjustable, so as to bring the burner K within proper distance of the mold H.

The mold H, as is well known, consists of two plates hinged together by a pintle, L', having the pin *h'*, already mentioned, each of said plates having a handle, M M', respectively, for convenience in operating.

In operation two molds, H, are used at a time, and while one of them is being filled the other is being baked over the burner K, each mold being successively brought over said burner by swinging the arms E E' around the central standard, B. The distance between the bearings *i i'* and the bearings *g g* on the standards G G' exceeds the width of the mold to the extent of one-half of an inch, (or thereabout,) and the journals *h* and *h'* are longer than the bearings on which they are mounted, so as to permit each mold to have a slight lateral movement. Thus when the mold is on the opposite side from the burner, and is pushed toward the standard B as far as possible, it is capable of being revolved around its pivots *h h'*, but when pulled in the opposite direction it is moved upon the projections *a* on said bearings *g*, and thereby prevented from being rotated around its pivots aforesaid. This is quite an essential feature in a machine of the kind mentioned, inasmuch as thereby the emptying and filling of the mold is facilitated and its proper position upon the gas-burner maintained.

It is perfectly obvious that molds of various lengths and widths may be used upon this machine, for the reason that the standards G G', as well as the bracket J and the burners K, are adjustable, and may therefore be changed in position to accommodate such different molds.

The burners K should be adapted for the particular mold in connection with which it is being used, and should be of about the same superficial area and contour as the former.

Having thus fully described our invention, we claim as new and desire to secure to us by Letters Patent of the United States—

1. In machines for baking hippen, wafers, and similar confects, the combination, with the molds H, of a revolving stand, consisting, essentially, of a tripod or base, A, standard B, double swinging arms E E', uprights G G', adjustably secured upon said arms E E', and provided with bearings for the said molds, and the fixed bracket J, with burner K, the whole being adapted for operation substantially in the manner as and for the object stated.

2. A supporting base and standard, in combination with a frame pivoted upon said standard, one or more molds pivoted on said frame, and a burner removably connected with said standard, said frame being provided with rests for supporting the molds in a horizontal position, substantially as specified.

In testimony that we claim the foregoing as our invention we have hereto set our hands in the presence of two subscribing witnesses.

JOS. O. MEYER.
WALTER STRICKLER.

Attest:
MICHAEL J. STARK,
WILLIAM O. STARK.